Nov. 6, 1956 G. DENHOLM ET AL 2,769,973
MEANS FOR INDICATING FAULTS ON ELECTRICALLY
DRIVEN CONVEYOR SYSTEMS
Filed Sept. 23, 1953
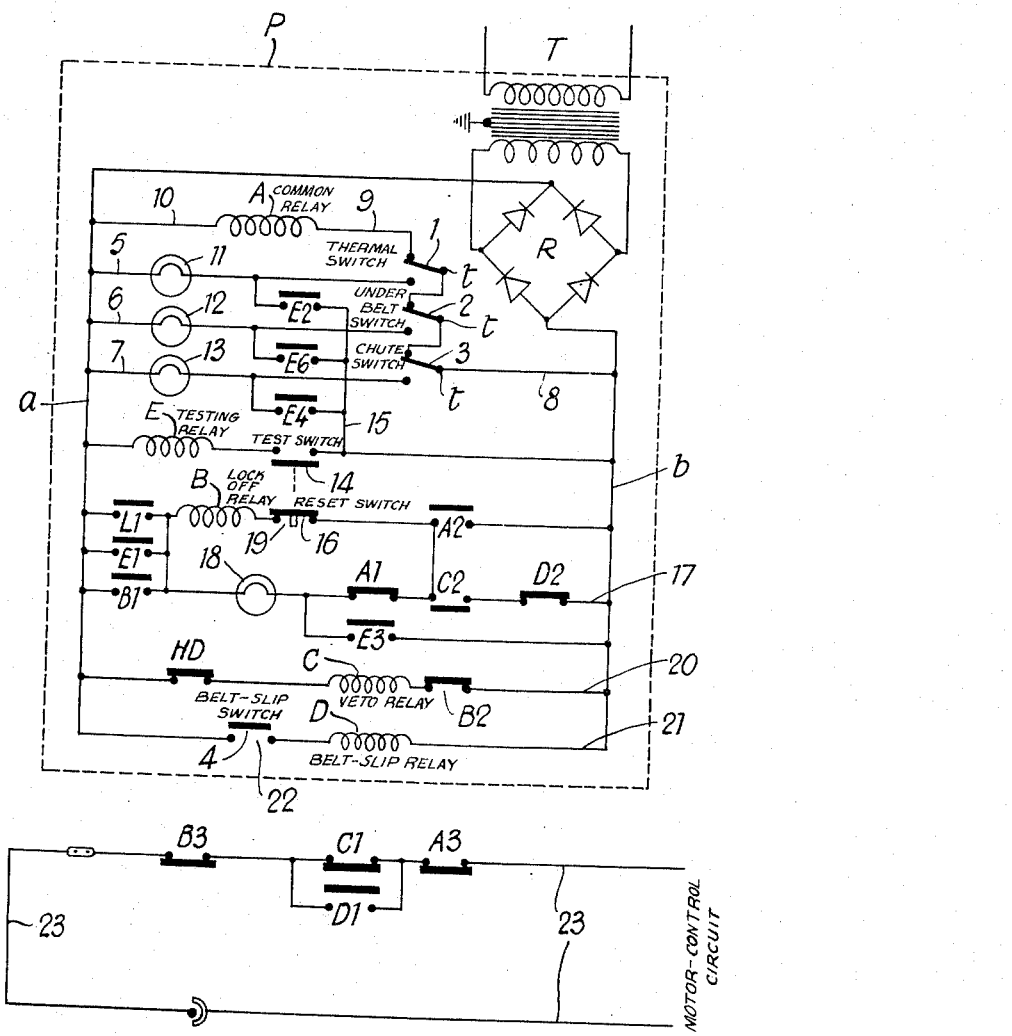
Inventors
George Denholm,
Leonard Archer Nordmann
by Sommers-Young
Attorneys

United States Patent Office 2,769,973
Patented Nov. 6, 1956

2,769,973

MEANS FOR INDICATING FAULTS ON ELECTRICALLY DRIVEN CONVEYOR SYSTEMS

George Denholm and Leonard Archer Nordmann, Gateshead-on-Tyne, England, assignors to Hugh Wood & Company Limited, Gateshead-on-Tyne, England, a British company Application September 23, 1953, Serial No. 381,911

Claims priority, application Great Britain December 17, 1952

6 Claims. (Cl. 340—267)

This invention relates to means for indicating faults one electrically driven conveyor systems and saving time in locating such faults.

With the advent of the numerous protective devices which are now fitted to electrically driven belt conveyors, particularly those used in coal mines, the need has arisen for the provision of means for indicating to the attendant, in the event of a stoppage of such a conveyor, which of the protective devices has operated to effect such stoppage. The problem did not present much difficulty until it became necessary to provide means for indicating a belt slip or breakage occurring during otherwise normal running. This difficulty will be understood from the fact that any stoppage of the conveyor will cause the belt to slow down and under normal conditions of stopping indication must not be given. Therefore, it is necessary to provide means whereby the indication of the operation of the belt slip or breakage device will become apparent only when the belt does actually slip or break. However, the term "actually slip or break" is not intended to cover one special case of slip which may take place on starting of such a conveyor.

It is the principal object of the present invention to provide means which will give an indication, of the operation of any of the protective devices, which is quite separate from that of the other devices, and which will not indicate belt slip or breakage under normal conditions of stopping, or at starting, of an electrically driven belt conveyor.

Another object is to provide means whereby during starting up of the conveyor, the belt-slip indicating circuit will be temporarily put out of action until the conveyor has settled down to normal running.

According to this invention, means for indicating faults in connection with an electrically driven belt conveyor fitted with a series of protective devices including one appertaining to belt-slip or breakage, is characterised in that the said means is operative to give an indication of the operation of each of the protective devices which is separate from that of the other or others and that the said means is such as to fail to give an indication of belt-slip under normal conditions of stopping, or at starting, of the conveyor.

According to another feature of the invention, each protective device of an electrically driven belt conveyor, with the exception of a protective device for belt slip or breakage, operates a switch, as a result of a fault, to close an indicating circuit, and the switch or switches thus operative, in their non-operative position close contacts in series with the coil of a common relay having a number of contactors one of which is adapted to maintain the belt-slip indicator circuit normally closed, another to maintain normally open the circuit of a coil of a lock-off relay which affects control of the conveyor motor and is arranged in series with a contactor that is relay operated from the conveyor motor starter, and a third to maintain the motor control circuit normally closed. Hence, in the event of a protective device other than the belt-slip device being operated, the belt-slip indicator will be open-circuited and so makes no indication, the motor control circuit is opened, the conveyor stopped, and the appropriate indicating means appertaining to such other protective device is energised.

It will be understood that the term "belt-slip" used herein includes belt-breakage in appropriate cases.

When the conveyor is being started up, a considerable amount of surge, with consequent slip, can occur on the belt, and to prevent the operation of the belt-slip protective device during the period in which the belt is reaching stability, delay switch means additionally are provided in circuit with the coil of a veto relay which, when its coil is energised, is adapted to open-circuit the belt-slip indicator and to close the motor control circuit during the period in which the delay switch remains closed.

In order to enable the invention to be readily understood, references is directed, by way of example, to the accompanying drawings which is a diagram showing a lay-out for an indicater panel on which are adapted to be indicated the operation of the usual "thermal," "under belt," "chute" and "belt-slip" protective devices respectively of a belt conveyor for use in coal mines.

In this diagram, the indicator panel is represented in dotted lines at P, and on the panel are the switches 1, 2, 3, 4 appertaining to and caused to be operated by the respective protective devices which, of course, are at remote places and are not illustrated. As will be seen the indicator circuits 5, 6, 7, respectively, of the first three of the above protective devices are connected at one end in parallel to the one power conductor $a$ which may be conveniently led from a rectifier R connected to the secondary of a step-down transformer T. The other ends of the circuits 5, 6, 7 are each respectively connected to one side of the three two-way switches 1, 2, 3 whose common terminals $t$ are connected in series with one another and, through the common lead 8, with the other power conductor $b$. The other sides of these three two-way switches are normally closed as shown and connected by the lead 9 to one end of the coil A of a common relay the other end of whose said coil is connected by lead 10 to the first power conductor. The three two-way switches 1, 2, 3 and the common coil A are thus connected in series across the power conductors $a$, $b$, while the three indicating circuits 5, 6, 7, are in parallel. The indicating means in the circuits 5, 6, 7 take the form of electric lamps 11, 12 and 13 respectively.

From points between the electric lamp and switch in each indicating circuit 5, 6, 7 connections are made to contacts E2, E4, E6 of a lamp testing relay whose coil E is connected across the power conductors $a$, $b$ in series with a test switch 14 arranged between it and the conductor 15 leading to the said contacts. The test switch 14 is also common to the resetting mechanism of the protective devices and, therefore, any operation of the resetting switch 16 temporarily lights the lamps 11, 12 and 13 and indicates whether any lamp has failed.

The belt-slip indicating circuit 17 is also connected across the power conductors $a$, $b$, its lamp 18 being in series on the one side with three pairs of contacts, one pair A1 of which is closed by the common relay when its coil A is energised; while the other two pairs C2, D2 are closed when the coils C, D of their respective relays, a veto relay and a belt-slip relay, are de-energised. These contacts A1, C2, D2 are themselves connected in parallel with a pair of normally open contacts E3 controlled by the testing relay, while the veto and belt-slip contacts C2, D2, are connected in parallel with a pair of contacts A2 normally maintained open by the common relay. On the other side of its circuit the belt-slip indicator lamp 18 is in series with three pairs of paralleled contacts E1, B1, L1, controlled respectively by the testing relay, a lock-off relay operative to stop the conveyor motor, and a relay (not shown), hereinafter termed gate-end relay, operated directly from the outgoing terminals of the gate-end control box of the conveyor, the first relay being normally open with its relay coil E de-energised, and the third relay normally open with its relay coil (not shown) de-energised.

The lock-off relay coil B is in series with the pairs of paralleled contacts on one side and, on the other side, with a pair of normally closed contacts at 19 appertaining to and adapted to be opened on the operation of the manually operated resetting switch 16, and with the pair of normally open contacts A2, controlled by the common relay, which as already stated is in parallel with the two normally closed pairs of contacts A1, A2 in series with the lamp 18 of the belt-slip indicating circuit 17. The lock-off relay maintains the contacts B1 in its own coil circuit closed after a fault.

The veto relay circuit 20 comprises a delay switch HD, the coil C of the veto relay, and a pair of normally closed contacts B2 adapted to be opened when the lock-off coil B is energised.

The belt-slip relay circuit 21 consists in the coil D of this relay in series with a pair of normally open contacts 22 adapted to be closed by a relay (not shown) energised by current from a dynamo driven through a belt pulley from the conveyor belt, and hereinafter referred to as the belt pulley relay.

Finally, in series with the motor control circuit 23, part only of which is and need be shown, is a pair of contacts A3 normally closed by the energised common relay, two pairs of contacts C1, D1 in parallel with each other, one pair D1 being normally open but adapted to be closed when the veto relay is energised, and the other C1 normally open, but adapted to be closed when the belt pulley relay is energised, and a pair of normally closed contacts B3 adapted to be opened when the lock-off relay is energized.

The respective contactors for the various pairs of contacts described are shown by thick lines as will be understood.

With the above lay-out, in the event of any of the first three protective devices operating, its respective switch 1, 2 or 3 closes its indicating circuit to light the lamp 11, 12 or 13, and opens the circuit of the coil A of the common relay and de-eenrgises this relay, causing the three contactors thereof at A1, A2, A3, respectively to open the belt-slip indicating circuit 17 so that its lamp 18 cannot be lit, close the circuit of the coil B of the lock-off relay to energise this relay, and open the motor control circuit 23.

The energised lock-off relay closes its first contacts B1 to maintain itself energised so that it is unaffected by the opening of the gate-end relay, opens the circuit of the coil C of the veto relay, and further opens the motor control circuit 23 at B3.

When there is slip on the conveyor belt or a breakage thereof, the belt pulley relay becomes de-energised as a result of the slowing down of the belt-driven dynamo, so that the circuit 21 of the coil D of the belt-slip relay is broken at 22 and the contactor at D2 of such relay drops to close the belt-slip indicating circuit 17 through the contacts C2 in series with the belt-slip contacts A1 on the one side of the lamp 18 and the starter relay contacts L1, while the other contactor at D1 of the belt slip relay opens the motor control circuit 23.

The conveyor is started up by inserting the delay switch HD which remains closed for a period of about 20 seconds. This closes the circuit of the coil C of the veto relay so that this relay opens the belt-slip indicating circuit 17 at C2, and closes the motor control circuit 23 at C1. At the end of the said period, the delay switch HD opens so that the indicating circuit 17 is remade and the motor control circuit 23 is again opened. By this time also the conveyor belt should have speeded up to normal speed so that the belt-slip relay will have been energised at its coil D, whereupon the belt-slip indicating circuit 17 is again opened at D2 and the motor control circuit 23 is closed at D1.

In the event of the power being removed from the conveyor by normal stopping or electrical failure, no indication will be given, for the reason that the starter controlled relay will open its contacts L1 before the belt pulley switch can open the belt-slip relay circuit at 22 whereas, under belt-slip or belt-break conditions, this circuit, then opened at 22, causes the belt-slip lamp 18 to be energised through its three pairs of contacts A1, C2, D2 on its one side, and the starter controlled relay contacts L1.

We claim:

1. In an electrical belt conveyor system comprising a belt conveyor fitted with a set of protective devices including one appertaining to belt slip and breakage and including another protective device appertaining to a condition other than belt slip and breakage, a set of electrically operated fault-indicating devices appertaining to the respective said protective devices, means operative on the functioning of said other protective device to energise the respective fault-indicating device, while at that time preventing energization of the belt slip and breakage indicating device, and means operative at starting of said conveyor to prevent energisation of the belt slip and breakage indicating device during a time-delay period and at the expiration of that period automatically to set the circuit of said belt slip and breakage indicating device for energisation of such device on occurrence of belt slip or breakage.

2. In an electrical belt conveyor system according to claim 1, means operative on normal stopping of the conveyor to prevent energisation of the belt slip and breakage indicating device.

3. In an electrical belt conveyor system according to claim 1, a normally open switch operated by said protective device other than the one appertaining to belt slip and breakage, this switch being arranged in the circuit of the corresponding fault-indicating device, a relay whose circuit is closed by said switch when opened, a lock-off relay which affects the control circuit of the conveyor motor, and a contactor disposed in series with said lock-off relay and open when the conveyor motor is stationary, the first-mentioned relay having a number of contactors of which, in the closed condition of the circuit of this relay, one has a closed condition in the circuit of the belt slip and breakage indicating device, another has an open condition in the circuit of said lock-off relay, and a third maintains the motor control circuit normally closed.

4. In an electrical belt conveyor system according to claim 1, a set of normally open switches operated by respective protective devices other than the one appertaining to belt slip and breakage, these switches being arranged in the circuits of the corresponding fault-indicating devices and connected up in such a way that when open they are in series with one another, a relay whose circuit is closed by said switches when opened, a lock-off relay which affects the control circuit of the conveyor motor, and a contactor disposed in series with said lock-off relay and open when the conveyor motor is stationary, the first-mentioned relay having a number of contactors of which, in the closed condition of the circuit of this relay, one has a closed condition in the circuit of the belt slip and breakage indicating device, another has an open condition in the circuit of said lock-off relay, and a third maintains the motor control circuit normally closed.

5. In an electrical belt conveyor system according to claim 3, a veto relay and a time delay switch controlling said relay, the latter being operative to open-circuit the belt slip and breakage indicating device and to close the motor control circuit during the period in which said time delay switch closes the circuit of such relay.

6. In an electrical belt conveyor system according to claim 3, a switch operative in the circuit of the belt slip and breakage indicating device under control of the motor starter, and a belt-slip relay operative, on the conveyor attaining normal speed on starting, to open the circuit of the belt slip and breakage indicating device and maintain the motor control circuit closed, said switch operating, on breakage of the motor control circuit by the starter to stop the conveyor, to open the circuit of the belt slip and breakage indicating device before said relay is de-energised through the slowing down of the conveyor.

References Cited in the file of this patent

UNITED STATES PATENTS

| | | |
|---|---|---|
| 433,549 | Soule | Aug. 5, 1890 |
| 1,444,775 | Bennett | Feb. 13, 1923 |
| 1,790,681 | Smith | Feb. 3, 1931 |